(12) United States Patent
LeMieux

(10) Patent No.: US 7,086,834 B2
(45) Date of Patent: Aug. 8, 2006

(54) METHODS AND APPARATUS FOR ROTOR BLADE ICE DETECTION

(75) Inventor: David Lawrence LeMieux, Tehachapi, CA (US)

(73) Assignee: General Electric Company, Schenectady, NY (US)

( * ) Notice: Subject to any disclaimer, the term of this patent is extended or adjusted under 35 U.S.C. 154(b) by 154 days.

(21) Appl. No.: 10/865,376

(22) Filed: Jun. 10, 2004

(65) Prior Publication Data

US 2005/0276696 A1    Dec. 15, 2005

(51) Int. Cl.
*F03D 7/04* (2006.01)
(52) U.S. Cl. .............................. 416/1; 416/35; 416/37; 416/39; 416/61
(58) Field of Classification Search .................... 416/1, 416/35, 37, 39, 61; 415/118; 290/44, 55
See application file for complete search history.

(56) References Cited

U.S. PATENT DOCUMENTS

| | | | | |
|---|---|---|---|---|
| 4,553,137 A | * | 11/1985 | Marxer et al. ............... | 340/582 |
| 5,289,041 A | * | 2/1994 | Holley ......................... | 290/44 |
| 6,137,187 A | | 10/2000 | Mikhail et al. | |
| 6,420,795 B1 | | 7/2002 | Mikhail et al. | |
| 6,503,058 B1 | | 1/2003 | Selig et al. | |
| 6,940,185 B1 | * | 9/2005 | Andersen et al. ............. | 290/44 |
| 2004/0057828 A1 | | 3/2004 | Bosche | |

FOREIGN PATENT DOCUMENTS

WO    WO 01/33075 A1    5/2001

* cited by examiner

*Primary Examiner*—Ninh H. Nguyen
(74) *Attorney, Agent, or Firm*—James E. McGinness, Esq.; Armstrong Teasdale LLP

(57) ABSTRACT

A method for detecting ice on a wind turbine having a rotor and one or more rotor blades each having blade roots includes monitoring meteorological conditions relating to icing conditions and monitoring one or more physical characteristics of the wind turbine in operation that vary in accordance with at least one of the mass of the one or more rotor blades or a mass imbalance between the rotor blades. The method also includes using the one or more monitored physical characteristics to determine whether a blade mass anomaly exists, determining whether the monitored meteorological conditions are consistent with blade icing; and signaling an icing-related blade mass anomaly when a blade mass anomaly is determined to exist and the monitored meteorological conditions are determined to be consistent with icing.

45 Claims, 9 Drawing Sheets

METHODS AND APPARATUS FOR ROTOR BLADE ICE DETECTION

STATEMENT REGARDING FEDERALLY SPONSORED RESEARCH & DEVELOPMENT

The U.S. Government has a paid-up license in this invention and the right in limited circumstances to require the patent owner to license others on reasonable terms as provided for by the terms of Next Generation Turbine (NGT) Development Contract No. ZAM-7-13320-26 awarded by the Department of Energy (DOE) and managed through the National Renewable Energy Laboratory (NREL).

BACKGROUND OF THE INVENTION

This invention relates generally to wind turbines, and more particularly to the detection of ice on rotor blades of wind turbines.

Recently, wind turbines have received increased attention as an environmentally safe and relatively inexpensive alternative energy source. With this growing interest, considerable efforts have been made to develop wind turbines that are reliable and efficient.

Generally, a wind turbine includes a rotor having multiple blades. The rotor is mounted within a housing or nacelle, which is positioned on top of a truss or tubular tower. Utility grade wind turbines (i.e., wind turbines designed to provide electrical power to a utility grid) can have large rotors (e.g., 30 or more meters in diameter). Blades on these rotors transform wind energy into a rotational torque or force that drives one or more generators, rotationally coupled to the rotor through a gearbox. The gearbox steps up the inherently low rotational speed of the turbine rotor for the generator to efficiently convert mechanical energy to electrical energy, which is fed into a utility grid.

Under some atmospheric conditions, the rotor blades become covered with ice. Ice buildup typically occurs on the leading edge of the airfoil and causes a reduced lifting capability. As the ice layer becomes increasingly thick, weight is added to the airfoil so that the lifting airfoil surface becomes modified. For wind turbines, this modification can result in diminished aerodynamic rotor blade performance. This reduced performance can directly result in increased system loads and/or lost power output.

BRIEF DESCRIPTION OF THE INVENTION

Some configurations of the present invention therefore provide a method for detecting ice on a wind turbine having a rotor and one or more rotor blades each having blade roots. The method includes monitoring meteorological conditions relating to icing conditions and monitoring one or more physical characteristics of the wind turbine in operation that vary in accordance with at least one of the mass of the one or more rotor blades or a mass imbalance between the rotor blades. The method also includes using the one or more monitored physical characteristics to determine whether a blade mass anomaly exists, determining whether the monitored meteorological conditions are consistent with blade icing; and signaling an icing-related blade mass anomaly when a blade mass anomaly is determined to exist and the monitored meteorological conditions are determined to be consistent with icing.

In another aspect, some configurations of the present invention provide a method for detecting ice on a wind turbine having a rotor and one or more rotor blades each having blade roots. The method includes monitoring meteorological conditions relating to icing conditions and monitoring one or more physical characteristics of the wind turbine in operation that vary in accordance with at least one of the mass of the one or more rotor blades or a mass imbalance between the rotor blade. In this aspect, the physical characteristics include at least blade root bending moments. The method further includes using the one or more monitored physical characteristics to determine whether a blade mass anomaly exists, determining whether the monitored meteorological conditions are consistent with blade icing, and signaling an icing-related blade mass anomaly when a blade mass anomaly is determined to exist and the monitored meteorological conditions are determined to be consistent with icing.

In still another aspect, some configurations of the present invention provide a wind turbine that includes a rotor having one or more rotor blades, one or more meteorological sensors configured to monitor meteorological conditions relating to icing, and one or more physical characteristic sensors configured to monitor one or more physical characteristics of the wind turbine in operation that vary in accordance with at least one of a mass of said one or more rotor blades or a mass imbalance between the rotor blades. The wind turbine further includes a processor operably coupled to the one or more meteorological sensors and the one or more physical characteristic sensors. The processor is configured to determine whether the monitored meteorological conditions are consistent with blade icing, use the one or more monitored physical characteristics to determine whether a blade mass anomaly exists, and generate a signal indicating an icing-related blade anomaly when the existence of a blade mass anomaly is determined and the monitored meteorological conditions are determined to be consistent with icing.

In yet another aspect, some configurations of the present invention provide a wind turbine that includes a rotor having one or more rotor blades, one or more meteorological sensors configured to monitor meteorological conditions relating to icing, and one or more physical characteristic sensors configured to monitor one or more physical characteristics of the wind turbine in operation that vary in accordance with at least one of a mass of the one or more rotor blades or a mass imbalance between the rotor blades. In this aspect, the physical characteristic sensors include at least one sensor that monitors blade root bending moments. The wind turbine further includes a processor operably coupled to the one or more meteorological sensors and the one or more physical characteristic sensors. The processor is configured to determine whether the monitored meteorological conditions are consistent with blade icing, use the one or more monitored physical characteristics to determine whether a blade mass anomaly exists, and generate a signal indicating an icing-related blade anomaly when the existence of a blade mass anomaly is determined and the monitored meteorological conditions are determined to be consistent with icing.

In still other aspects, a wind turbine is provided that has a rotor having at least one blade, a nacelle, and a yaw control system. The wind turbine is configured to yaw the nacelle and to signal a blade mass imbalance when a variable gyroscopic load is detected when the nacelle is yawed.

In yet other aspects, a method for detecting a blade mass imbalance is provided. The method includes yawing a nacelle of a wind turbine and signaling a blade mass imbalance when a variable gyroscopic load is detected when the nacelle is yawed.

In still other aspects, a wind turbine including a rotor having at least one blade, a pitch system, a turbine controller, and meteorological instrumentation configured to measure wind speed is provided. The controller is configured to signal a blade mass anomaly when the blades are pitched outside of a predetermined nominal range for a measured wind speed.

In yet other aspects, a method for detecting a blade mass anomaly on a wind turbine is provided. The wind turbine includes at least one blade, a pitch system, and meteorological instrumentation configured to measure wind speed. The method includes measuring a wind speed using the meteorological instrumentation, comparing a pitch of the blades to a predetermined nominal range for the measured wind speed, and signaling a blade mass anomaly when the blades are pitched outside of the predetermined nominal range for the measured wind speed.

It will thus be appreciated that configurations of the present invention allow the detection and signaling of icing-related blade mass anomalies that can reduce the performance of wind turbine generators, allowing corrective actions to be taken if necessary.

DETAILED DESCRIPTION OF THE INVENTION

As used herein, a physical or meteorological parameter is "monitored" when a sensor is used to determine its present value. The broader term "monitored" is used rather than the narrower term "measured" to emphasize that the sensor may but need not necessarily provide a direct measurement of the parameter being monitored. For example, an anemometer used as a meteorological sensor may generate an analog signal relating to the present wind speed, but the analog signal is not an actual measurement of the wind speed. Nevertheless, this signal or a digital representation of the signal can be used to determine wind speed, or a design choice may be made to use the signal, its digital representation, or its representation with further processing as a proxy for wind speed.

Also as used herein, the term "meteorological sensor" refers to a sensor of a meteorological condition. A non-exhaustive list of meteorological conditions include, for example, air pressure, wind speed and direction, humidity, temperature, and precipitation and precipitation type. All of the example meteorological conditions are meteorological conditions relating to icing. A non-exhaustive list of some of the most commonly used meteorological sensors that monitor meteorological conditions relating to icing includes temperature and humidity sensors.

Also as used herein, the term "physical characteristic sensor configured to monitor one or more physical characteristics of the wind turbine in operation that vary in accordance with at least one of a mass of one or more rotor blades or a mass imbalance between rotor blades" refers to a sensor that would generate a signal that would change in accordance with at least one of the stated mass change or mass imbalance. A non-exhaustive list of such physical characteristics includes blade root bending moments, axial or bending displacement of a shaft, hub, or flange surface, blade rotation speed and azimuth position, blade lift, output power variations, aerodynamic efficiency, and system loads.

In addition, as used herein, the term "blade root" or "blade root section" refers to the inboard portion of a rotor blade.

As further explained herein, various configurations of the present invention monitor meteorological conditions relating to icing conditions and one or more physical characteristics of a wind turbine in operation that vary in accordance with at least one of a mass of one or more rotor blades or a mass imbalance between rotor blades. The one or more monitored physical characteristics are used to determine whether a blade mass anomaly exists, and the monitored meteorological conditions are used to determine whether meteorological conditions are consistent with blade icing. An icing-related blade mass anomaly is signaled when a blade mass anomaly is determined to exist and the monitored meteorological conditions are determined to be consistent with icing.

Figure 1:
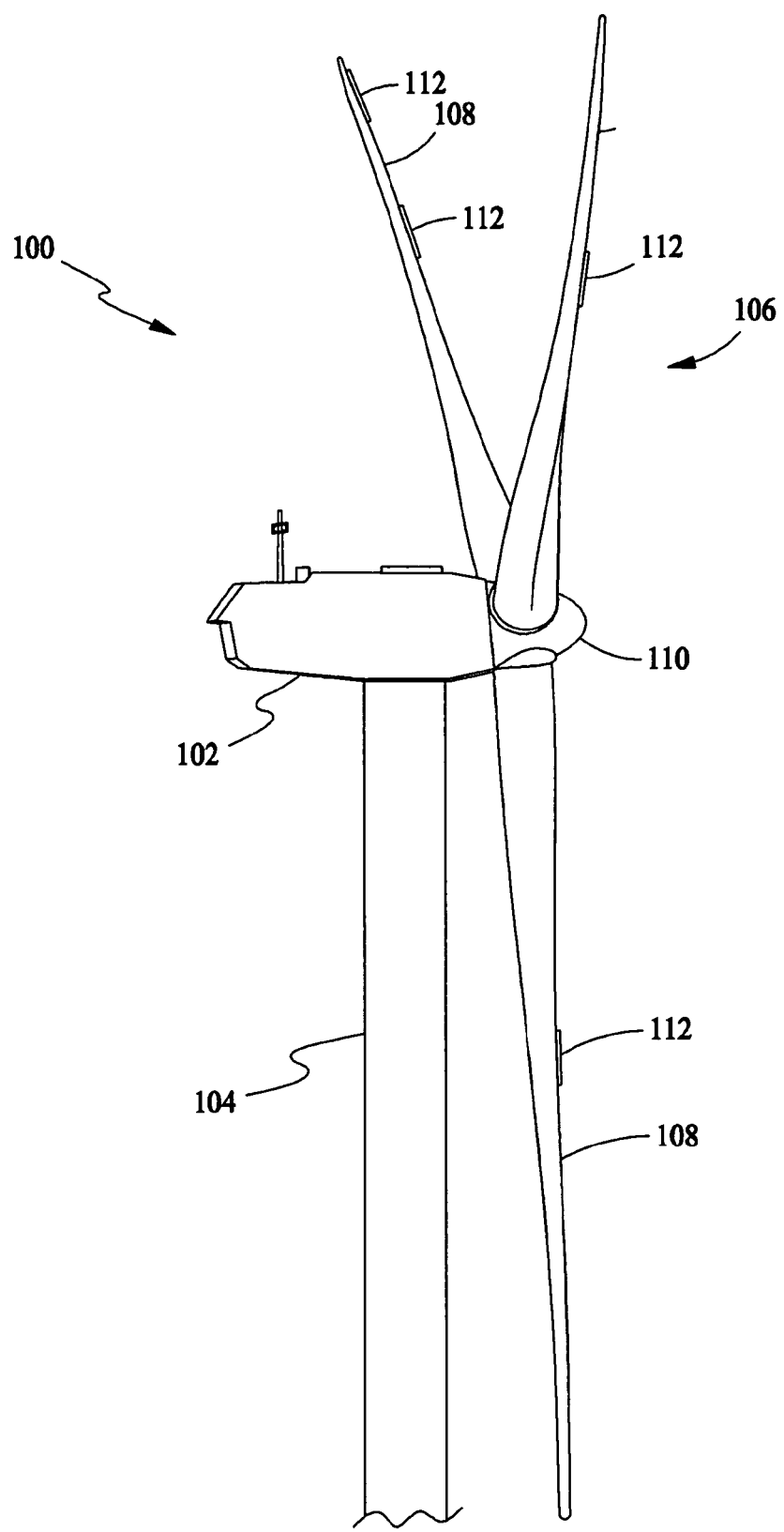
FIG. 1 is a drawing of an exemplary configuration of a wind turbine.

More particularly, in some configurations and referring to FIG. 1, a wind turbine 100 comprises a nacelle 102 housing a generator (not shown in FIG. 1). Nacelle 102 is mounted atop a tall tower 104, only a portion of which is shown in FIG. 1. Wind turbine 100 also comprises a rotor 106 that includes one or more rotor blades 108 attached to a rotating hub 110. Although wind turbine 100 illustrated in FIG. 1 includes three rotor blades 108, there are no specific limits on the number of rotor blades 108 required by the present invention. Under some atmospheric conditions, blade icing can occur, and ice 112 can form on blades 108.

The conditions under which this ice forms can result in ice 112 forming, for example, in layers that are identical on each blade 108, but there is no guarantee that icing on each blade will necessarily be uniform or identical from blade to blade. Therefore, blade icing 112 can cause either a mass imbalance or a mass change (or both) to occur to rotor 106. A blade mass imbalance can occur as a result of one or more blades 108 accumulating more ice 112 than another blade 108. A blade mass change can occur as a result of all blades 108 accumulating an equivalent blade icing mass load. Blade mass imbalances and blade mass changes are generically referred to herein as "blade mass anomalies." Some configurations of the present invention detect the presence of ice-related blade mass anomalies by monitoring system loads and/or lost power output, both of which result from reduced aerodynamic performance attributable to blade icing.

Figure 2:
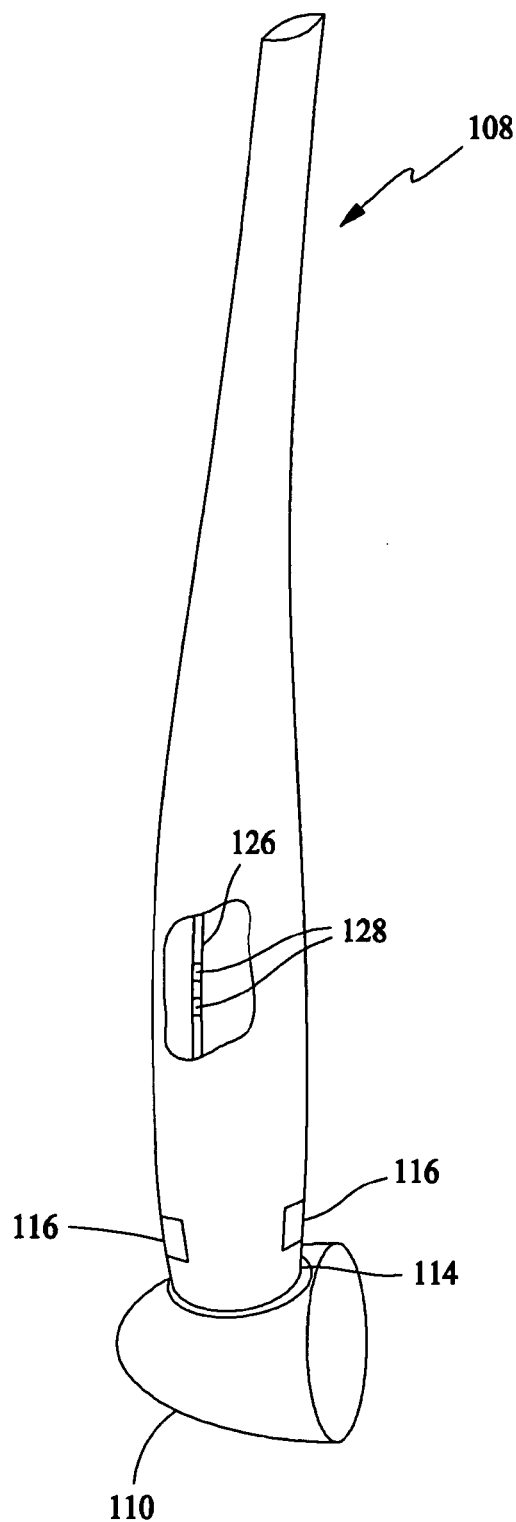
FIG. 2 is a partial cut-away perspective drawing of a wind turbine rotor blade and hub representative of various configurations of the present invention.

In some configurations and referring to FIG. 2, blade mass imbalance in rotor 106 is detected using monitored blade root 114 bending moments under near-zero yaw error conditions. Blade root 114 bending moments can be monitored using a variety of techniques and sensors in various configurations of the present invention, and some configurations utilize a combination of techniques and/or sensors. For example, in some configurations, one or more strain gauges 116 (such as solid state sensors available from Aerpac B.V., Overijssel, Netherlands) are embedded and/or bonded on in rotor blade 108. Strain gauges 116 produce a signal or signals that are sent to a computer or processor (not shown in FIG. 2) that determines blade root 114 bending moments from these signals. In some configurations, the computer or processor is a turbine controller that also provides addition functionality for wind turbine 100.

Figure 3:
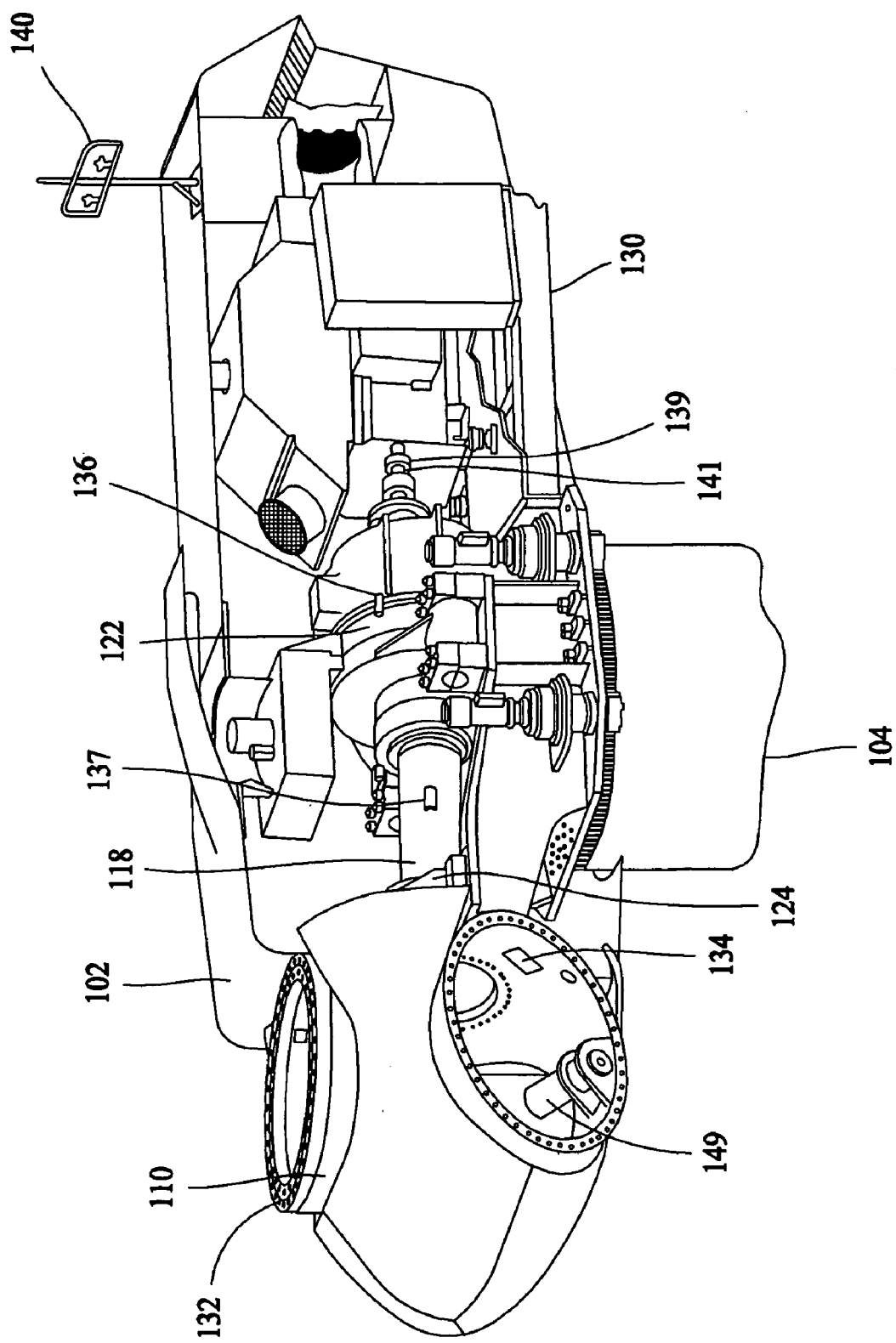
FIG. 3 is a partial cut-away perspective drawing of a hub and nacelle of the wind turbine shown in FIG. 1.
Figure 4:
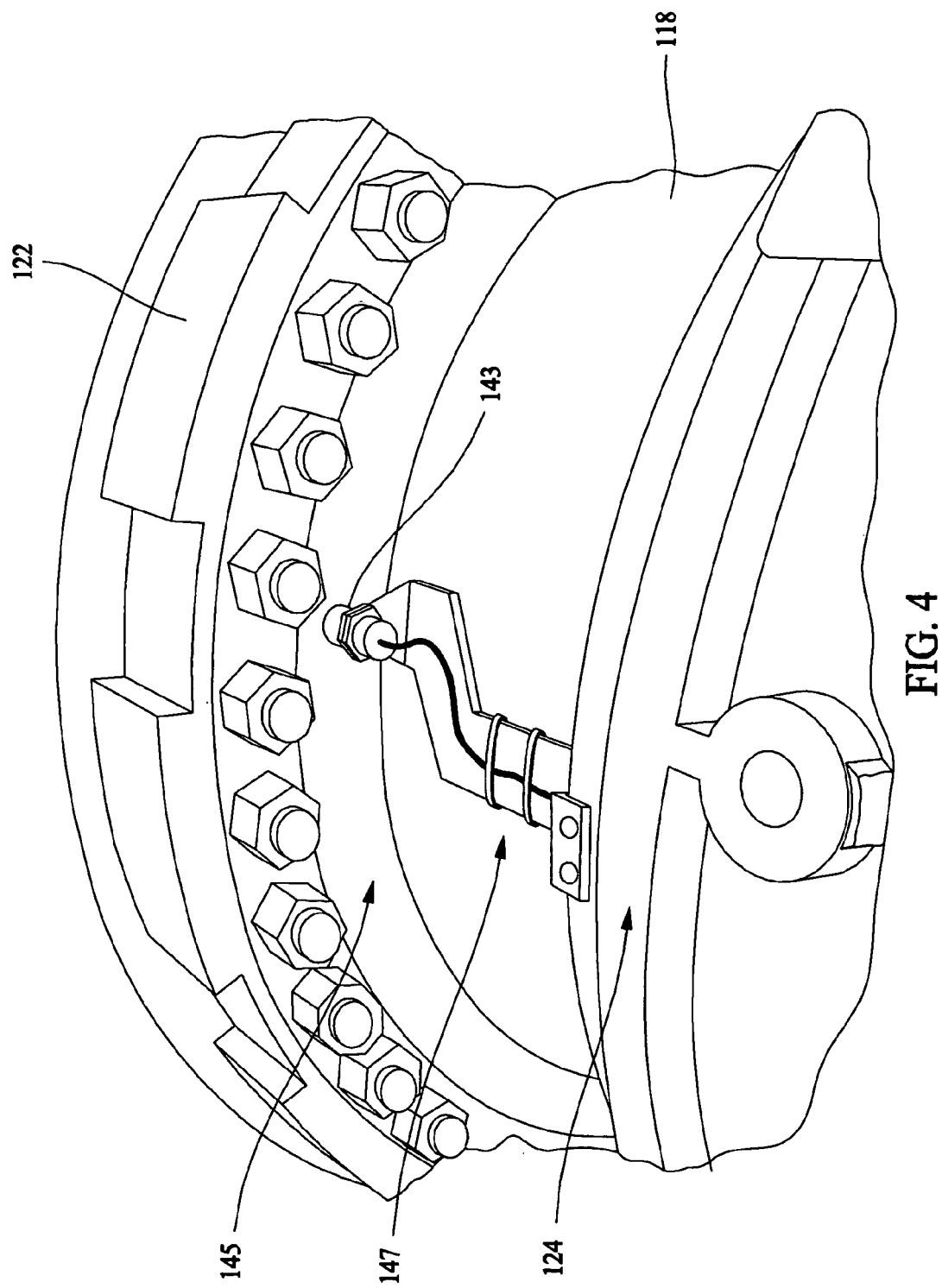
FIG. 4 is a perspective view of a portion of the main rotor shaft and a sensor used in some configurations of the present invention.
Figure 5:
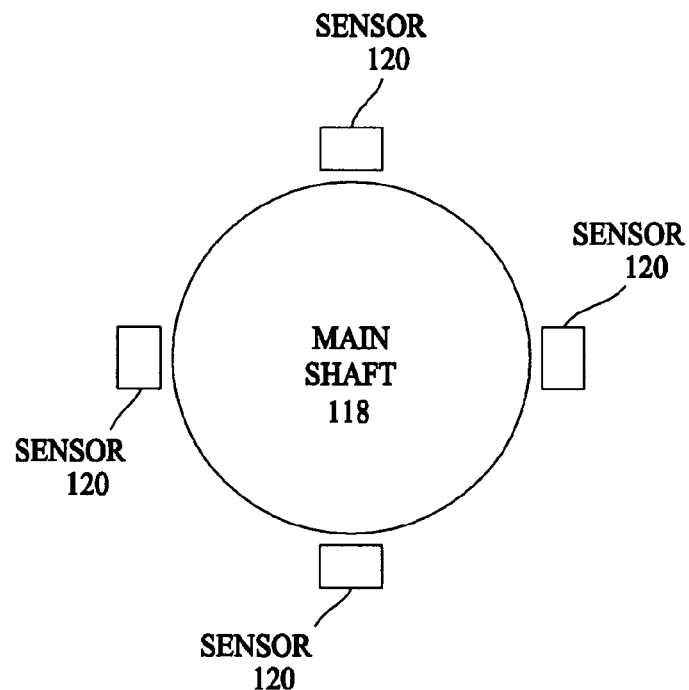
FIG. 5 is an end view of a main shaft having four sensors in a first configuration.

In some configurations and referring to FIGS. 3, 4, and 5 other techniques and sensors for measuring blade root 114 bending moments include measuring deflections and/or strain levels of rotor hub 110 at either main shaft 118 or at a shaft flange 145 at or near its connection to hub 110. When measuring hub deflection, a rotational orbit will be observed in the event of blade mass imbalance. Three or more sensors are used in some configurations of the present invention to sense axial and/or radial and/or bending displacement of the flange surface or deflection of shaft 118 and to produce signals that are sent to the computer or signal processor for interpretation. Deviations from expected amounts of strain (or any other monitored parameter) that are indicative of a blade mass anomaly (which may be either a blade mass imbalance or a blade mass change) are noted.

Figure 6:
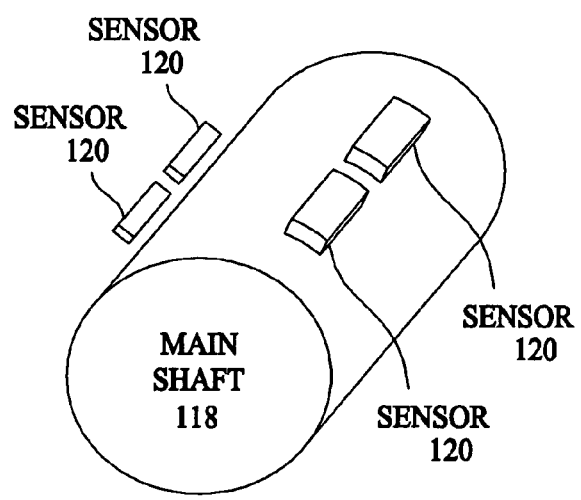
FIG. 6 is a perspective view of a main shaft having four sensors in a second configuration.
Figure 7:
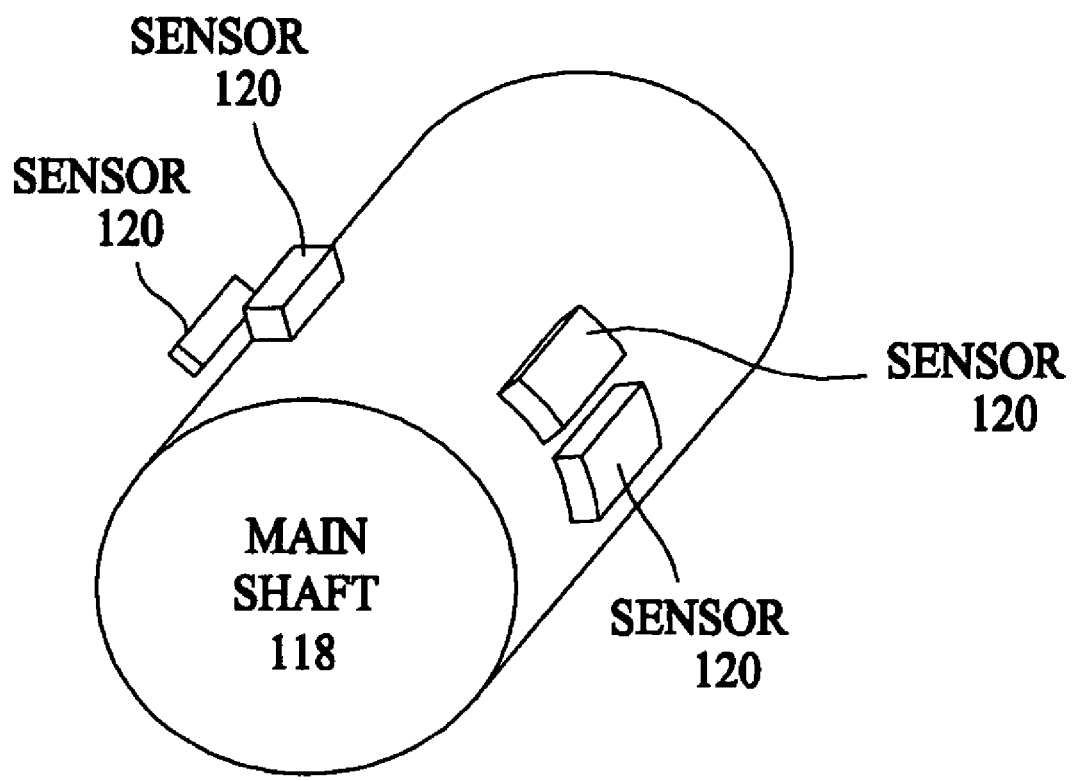
FIG. 7 is a perspective view of a main shaft having four sensors in a third configuration.

For example and referring to FIG. 5 some configurations of the present invention monitor main shaft 118 radial displacement using at least two orthogonally-mounted proximity probes 120. This radial displacement is used to determine whether a deviation indicative of a blade mass imbalance exists. For example, sensors or probes 120 measuring displacement of shaft 118 can utilize one or more technologies such as acoustic, optical, magnetic, eddy current, capacitive, or inductive field, or other technologies. Although at least two sensors are used to monitor radial displacement, for redundancy, sensor diagnostic purposes, or other reasons, more than two sensors are used in some configurations. FIG. 6, for example, illustrates a configuration with four sensors 120 positioned 90° apart around the circumference of the main rotor shaft 118. In another configuration and referring to FIG. 7, four sensors 120 are positioned in pairs 90° apart from one another around main shaft 118. In some configurations and referring to FIG. 3, sensors 120 (not shown in FIG. 3) are located as far as possible from gearbox 122. In other configurations, sensors 120 are located approximately midway between gearbox 122 and main bearing 124.

In some configurations and referring to FIG. 4, axial displacement is monitored in some configurations of the present invention. Sensors 143, such as proximity sensors, are utilized to monitor shaft flange 145 displacement. In some configurations, each sensor 143 is mounted on a sensor bracket 147 that is attached to main bearing 124 or a bedplate (not shown). Signals from sensors 143 indicate monitored displacements or moments. In some configurations, at least three sensors 143 are used to measure displacements of main shaft flange 145 of wind turbine 100 resulting from asymmetric loads such as blade mass imbalance due to icing. Sensors 143 can be proximity sensors that measure main shaft flange 145 displacement relative to a non-deflecting reference frame, for example, main bearing 124. Some configurations utilize four sensors with approximately 90 degree spacing to measure displacements of shaft flange 145.

In some configurations and referring again to FIG. 2, at least one embedded optical fiber 126 having one or more Bragg gratings 128 is used to monitor strain in each rotor blade root 114 to determine whether a strain deviation indicative of a blade mass imbalance exists. One or more lasers (not shown in the figures), which may be located in hub 110 are used to illuminate optical fibers 126. An electronic interface (also not shown in the figures) is used in some configurations to convert signals resulting from the monitoring of rotor blade root strain into digital signals that can be recognized and used by a computer or processor. Referring again to FIG. 3, in some configurations, a plurality of instrumenting T-bolts attach rotor blades 108 to hub 110. These T-bolts are provided with strain gauges that are used to provide strain information to the computer or signal processor. For example, in some configurations, instrumenting T-bolts are installed in the rotor blade and are subsequently attached to pitch bearings as shown diagrammatically by a representative attachment point 132 in FIG. 3. Also in some configurations, a strain gauge 134 is welded directly to rotor hub casting 110. Some configurations monitor gear box 122 motion in a vertical and horizontal plane using a gear ring proximity sensor 136, with proximity sensors 136 located at four quadrants (e.g., 45°, 135°, 225°, and 315°), only one of which is shown. Gear box 122 motion is resolved into a vector to determine whether a rotor blade mass imbalance exists. (As used herein, the terms "sensor" and "probe" are synonymous.)

In various configurations, blade azimuth position and rotation speed is monitored using proximity sensors and/or shaft encoders. A proximity probe 137 facing main shaft 118 provides a digital pulse when a marker tab, corresponding to a specific rotor blade azimuth position, rotates beneath the sensor. As an alternative, an encoder 139 can be used, attached to low speed shaft 141 through a coupling (not shown). The use of both alternatives and/or additional sensors or encoders in a single embodiment is allowed and can be used to provide redundancy for increased reliability. Signals from sensor(s) 137 and/or encoder(s) 139 are sent to the computer or signal processor and used to determine blade azimuth position and rotation speed.

Configurations of the present invention utilize one or more of the sensor configurations described above, and the computer or signal processor is used to identify, from monitored parameters, rotating vector changes of hub 110 in either magnitude or direction (or both), and/or differential strain in rotor blade roots 114. These vector changes and/or differential strains, when identified, are deviations indicative of blade mass imbalances. Known physical laws of mass, motion, and momentum can be used by the computer or signal processor to warn of such imbalances. Some deviations (e.g., orbital motions) also require knowledge of the positions of individual blades. These positions can be determined using the signals provided by proximity sensors and/or shaft encoders.

Air conditions are also monitored in some configurations (e.g., temperature changes, pressure changes, humidity) using one or more standard meteorological sensors to determine whether meteorological conditions are conducive to ice. Meteorological sensor(s) 140 can be located near blades 108 of wind turbine 100, for example, on tower 104 or nacelle 102 (as shown in FIG. 3), to more accurately reflect conditions at the level of rotor blades 108. In some configurations of the present invention, to prevent false icing alarms, ice detection logic and/or ice warning logic is disabled if monitored meteorological parameter signals from meteorological sensors 140 indicate that icing is improbable (e.g., the humidity is too low or the temperature is too high). However, blade mass imbalance may result from other unknown conditions. Thus, it is permitted but not required for configurations of the present invention to provide a non-icing-related anomaly alarm when meteorological sensors 140 indicate that icing is improbable, but a blade mass anomaly is indicated.

Blade imbalance can also result from yaw. Therefore, to avoid raising false icing condition alarms due to blade imbalance resulting from yaw, some configurations of the present invention monitor yaw error conditions using any known method for doing so. In these configurations, the computer or signal processor is inhibited from providing a blade imbalance icing warning except when near-zero yaw error conditions are monitored. "Near zero" yaw exists when rotor 106 is facing into the wind such that blade root strains and other imbalances resulting from yaw are substantially reduced relative to strains and imbalances that would result from an amount of icing that may reasonably be detected by a configuration of the present invention. A trade-off exists between detectable amounts of icing and the amount of yaw that can be tolerated such that the maximum amount of yaw in "near zero" yaw conditions is a design choice that can be left to one of ordinary skill in the art after gaining an appreciation of the principles of operation of the present invention.

In configurations of the present invention that detect blade mass imbalance by measuring blade root 14 bending moments under near-zero yaw-error conditions, a short-term mean signal that is present due to wind shear is filtered from the monitored blade root bending moment signal. In configurations in which blade aerodynamic performance is used to determine blade mass imbalance, blade aerodynamic performance is determined in some configurations using monitored blade rotational speed and mean free wind speed that is monitored using meteorologic instrumentation 140. A known wind condition (forcing function) produces a known dynamic response within a window of accuracy. This dynamic response is monitored by a load sensor directly or indirectly measuring root bending moments. In the event of an imbalance, an anomaly in the dynamic response will be observed when compared to a baseline operating condition when environment conditions do not support icing conditions (e.g., the temperature is too high). More specifically, a Parks DQ transformation is used to accommodate for rotating frame (flange surface and blade azimuth reset tab) to fixed frame (proximity sensors), which can be viewed as a horizontal or vertical vector or a rotating vector. This vector represents deflection of the monitored component. This deflection can be correlated to blade root bending moments. A reduction in blade lift can also be attributable to icing conditions. Blade lift causes a bending moment in the flap plane and is monitored in some configurations by monitoring blade bending sinusoidal signals and comparing these signals to previously recorded and stored signals of a blade operating in a known non-ice-load case in similar wind conditions.

In many configurations, blade root bending moments are monitored along a near flapwise root bending axis (i.e., perpendicular to the chord line, a straight line from the leading edge to the trailing edge). However, blade root bending moments can also be monitored in the near edgewise root bending axis.

Because icing produces reduced aerodynamic performance and/or increased blade mass, some configurations utilize signals from sensors monitoring pitch motors used for adjusting blade pitch. (Blade pitches are adjusted using pitch control 149, shown in FIG. 3.) Blade mass anomalies can be indicated by sensors monitoring pitch motor actuator response, as the response may become more sluggish when icing occurs.

Ice on a rotor blade can be detected by sound. Therefore, additional sensors, such as vibration sensors or microphones (not shown), can be used to monitor acoustic properties of blades 108 or tower 104 to detect icing. A blade mass change can be indicated by a lowering of the natural frequency or a change in an acoustic signature of either a blade 108 or of tower 104. A blade mass imbalance can be indicated by a differential lowering of the natural frequencies of different blades 108. Any analysis of signals from the vibration sensors or microphones that can detect a lowering of natural frequency or a change in acoustic signature can be used to detect the existence of a blade mass anomaly.

In some configurations, blade mass imbalance is identified by a physical parameter sensor monitoring the output power of wind turbine 100. In some configurations, this parameter is monitored by using a recording current transformer or wattmeter, or any other instrument from which output power of wind turbine 100 can be inferred over a period of time. An unbalanced rotor 108 will, in many cases, produce an oscillation (for example, at the frequency or at harmonics of the present rotation frequency of rotor hub 110) that can be detected by such an analysis. Blade azimuth position and rotation speed sensors are used in some configurations to provide the present rotation frequency for the analysis. When an oscillation is detected that is suggestive of a blade mass imbalance (conditioned upon, in some configurations, monitored meteorological conditions being conducive for icing), an icing warning is provided. Also, in some configurations, reduced aerodynamic efficiency can likewise be detected and quantified using the monitored power signals.

In some configurations, blade mass changes are detected using monitored system loads that are compared to previously monitored system loads of an otherwise identical wind turbine to which known amounts of additional mass have been added to each rotor blade 108 in equal amounts. (As used herein, the term "otherwise identical" means having aerodynamic and power generating components that are essentially the same. It is not required that all aspects of the wind turbines being compared be identical if the different aspects are not related to aerodynamic or power generating performance. By way of example only, the size, shape, weight, and number of rotor blades 108 should be identical, but their color need not be.) Some of these configurations monitor blade root bending moments, for example, the bending moment in the edgewise direction. Increases in blade mass are likely to result in a change in the sinusoidal edgewise bending signal that can be detected by comparison to a comparable blade operating under similar wind conditions and known to be free of ice. Configurations of the present invention monitor either or both the amplitude or the RMS (root mean square) amplitude of the edgewise bending moment signal. A change in either or both indicates a change in blade mass.

Changes between blade mass imbalance conditions and the blade mass change condition may occur quickly. Using configurations of the present invention, it is possible to detect any blade icing case and identify ice shedding via short-term transient signals. Also, in some configurations of the present invention, the location of icing is detected using bending moment signals from sensors located on many locations along the span of the rotor blade. For example, and not by way of limitation, some configurations provide strain gauges located on the rotor blades, on the hub, on the main shaft, via the main shaft flange sensors via other methods.

Figure 8:
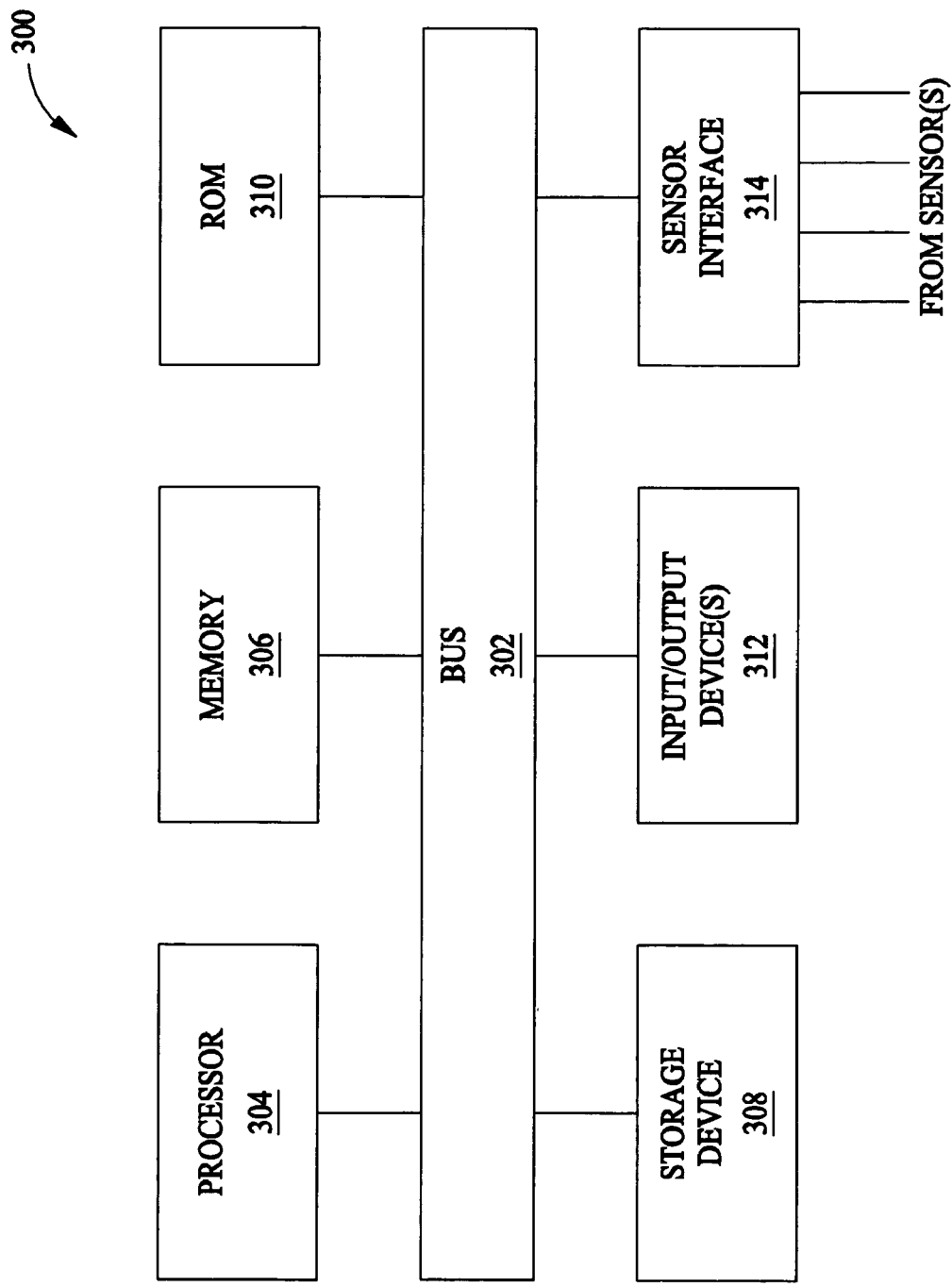
FIG. 8 is a block diagram of one embodiment of a turbine controller.

In some configurations and referring to FIG. 8, a turbine controller 300 includes a bus 302 or other communications device to communicate information. Processor(s) 304 are coupled to bus 302 to process information, including information from various sensors (for example, sensors 116, 120, 128, and 140) to determine whether a blade mass imbalance or a blade mass change due to icing is present. Turbine controller 300 further includes random access memory (RAM) 306 and/or other storage device(s) 308. RAM 306 and storage device(s) 308 are coupled to bus 302 to store and transfer information and instructions to be executed by processor(s) 304. RAM 306 (and also storage device(s) 308, if required) can also be used to store temporary variables or other intermediate information during execution of instructions by processor(s) 304. Turbine controller 300 can also include read only memory (ROM) and or other static storage device 310, which is coupled to bus 302 to store and provide static (i.e., non-changing) information and instructions to processor(s) 304. Input device(s) at 312 can include any of the physical characteristic monitoring devices described herein or known in the art to provide input data to turbine controller 300. Output devices at 312 can include devices that provide visual and/or audible indications to an operator console (also not shown in FIG. 8), or to an automatic apparatus that acts on or relays such information. Instructions are provided to memory from a storage device, such as magnetic disk, a read-only memory (ROM) integrated circuit, CD-ROM, DVD, via a remote connection that is either wired or wireless providing access to one or more electronically-accessible media, etc. In some embodiments, hard-wired circuitry can be used in place of or in combination with software instructions. Thus, execution of sequences of instructions is not limited to any specific combination of hardware circuitry and software instructions.

Sensor interface 314 is an interface that allows turbine controller 300 to communicate with one or more sensors within a wind turbine, including sensors used for determination of blade mass imbalance and blade mass change. Sensor interface 314 can be or can comprise, for example, one or more analog-to-digital converters that convert analog signals into digital signals that can be used by processor(s) 304.

Figure 9A:
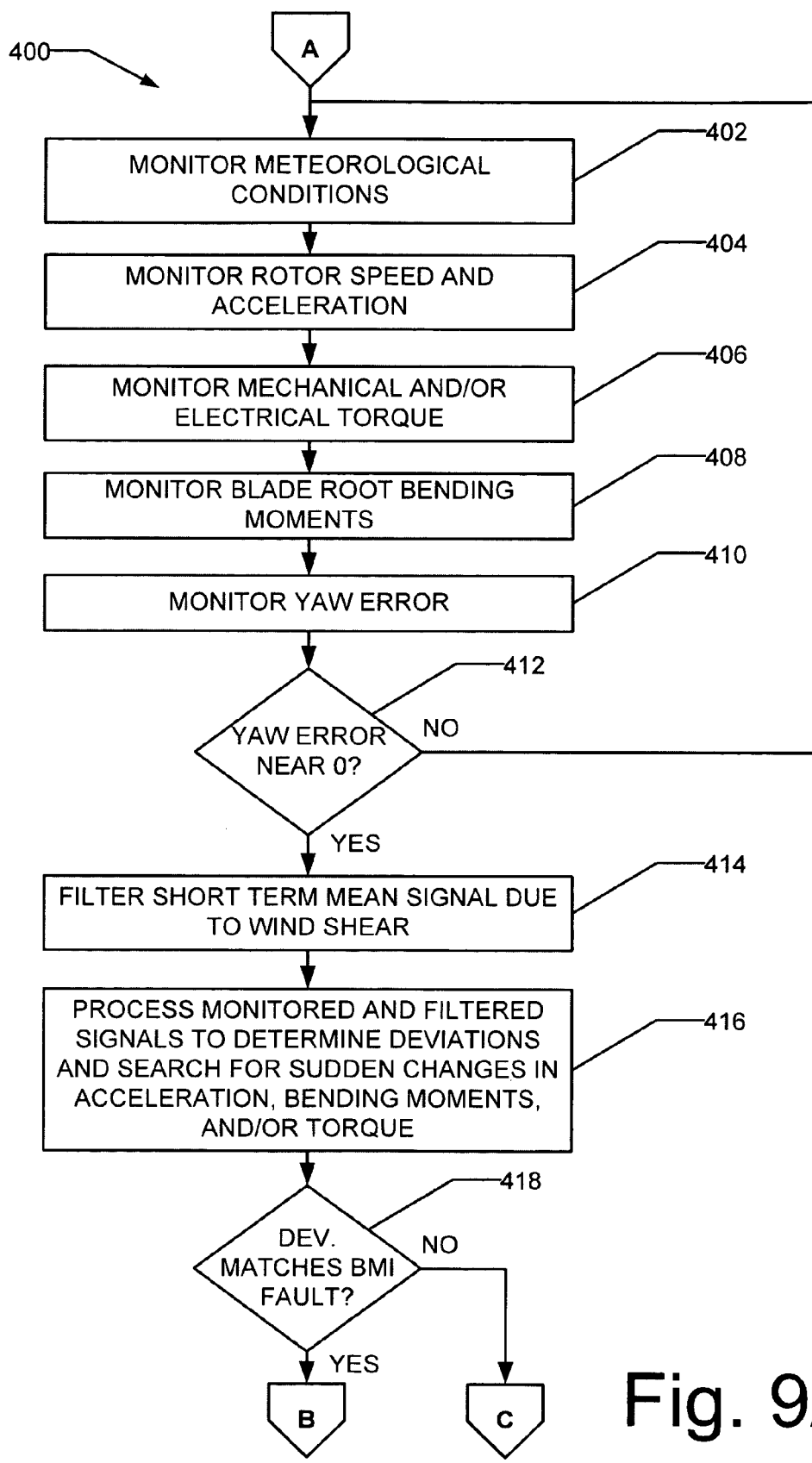
FIG. 9 is a flow chart representative of some configurations of a method for detecting blade mass imbalance and/or blade mass change.
Figure 9B:
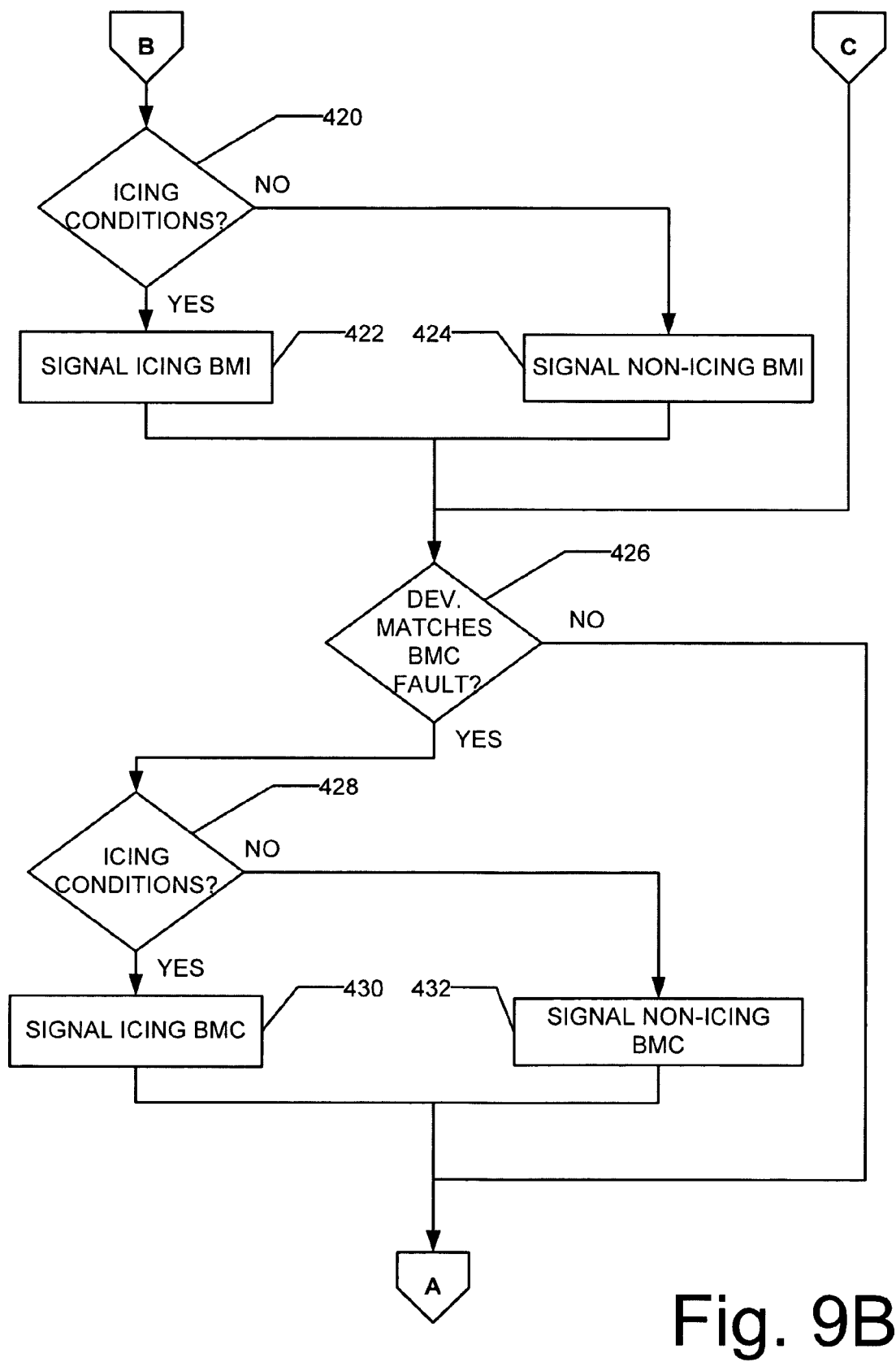

In some configurations and referring to flow chart 400 of FIG. 9, meteorological conditions are monitored at 402 utilizing meteorological sensors 140. Various physical characteristics of the wind turbine in operation that vary in accordance with at least one of the mass of the one or more rotor blades 108 or a mass imbalance between rotor blades 108 are also monitored. In embodiments represented by flow chart 400, the monitoring of such physical conditions occurs at steps 404, 406, and 408. Thus, rotor 106 speed and acceleration (and in some configurations, changes in acceleration) are monitored at 404 in some configurations in which blade mass imbalance is monitored. In some configurations in which blade mass change is monitored, mechanical and/or electrical torque is monitored at 406. Blade root bending motions are monitored at 408. Some configurations do not monitor yaw error and proceed directly to step 414. However, many configurations do monitor yaw error at 410. If at 412, yaw error has been monitored and is not near zero, some configurations incorporate an assumption that any stresses and rotor speed effects monitored at 404 and 408 are not the result of icing, but rather the result of gyroscopic loads induced from a yawing condition. Therefore, no action is taken to signal either a blade mass imbalance or a blade mass change. However, yaw conditions can change or be corrected by wind turbine 100, if wind turbine 100 is configured to make such a correction. Therefore, various configurations of the present invention either correct yaw error and then repeat steps 402, 404, 406, 408, and 410 (and perhaps 412), or repeat steps 402, 404, 406, 408, and 410 until a set of signals has been obtained with near-zero yaw error. (In addition to performing steps indicated in flow chart 400, the computer, processor, and/or turbine controller 300 in some configurations can also be programmed to assist in correcting yaw error.)

Not all of steps 402, 404, 406, 408, and 410 are required to be performed in all configurations of the present invention. Furthermore, the sequence in which steps 402, 404, 406, 408, and 410 are performed is immaterial, although in some configurations, these steps are performed in a sufficiently short period of time so that their relationship to one another is reliably established.

One or more of the monitored physical characteristics is used to determine whether a blade mass anomaly exists. Thus, if yaw error is near zero at 412, a short term mean signal due to wind shear is filtered from the blade root bending moments at 414 in configurations in which blade root bending moment is monitored. Next, filtered signals (in configurations in which filtering is performed at 412) and any monitored signals are processed at 416 to determine deviations from values expected when the mass of rotor blades 108 are balanced in configurations in which blade mass imbalance is monitored. In configurations in which blade mass change is monitored, a check is made for sudden changes in acceleration, bending moments, and/or torque (mechanical and/or electrical). Deviations of any of the filtered or monitored signals can be used to determine whether a blade mass imbalance exists at 418 and/or whether a blade mass change exists at 426.

Many configurations of the present invention also determine whether the monitored meteorological conditions are consistent with blade icing. Thus, in configurations in which blade mass imbalance is checked, if a deviation is found that indicates a blade mass imbalance fault at 418, the atmospheric conditions indicated by the meteorological sensors are analyzed at 420 to determine whether these conditions are consistent with blade icing. (Icing is considered possible if current meteorological conditions exist that are conducive to icing, or if such conditions have existed recently enough that any ice that may have formed may still exist on rotor blades 108.) If icing is possible (which in some configurations can mean, for example, that the probability of icing exceeds a selected threshold), a blade mass imbalance due to icing conditions is signaled at 422. Some configurations signal a non-icing blade mass imbalance at 424 if icing is determined not to be possible at 422, although blade mass imbalance resulting from conditions other than icing is not indicated in every configuration of the present invention. A signal generated at 422 can be used in some configurations to automatically initiate corrective action (such as activating deicers on a blade 108 determined to have icing or pitching rotor blades 108 toward feathered positions to the wind to reduce stress). In some configurations, an icing-related blade mass imbalance signal is indicated at a remote console to alert an operator that remedial action is warranted. In configurations in which blade mass imbalance not due to icing is signaled, different corrective action(s) may be warranted. Whether and how such corrective actions are performed is not considered to be an essential part of the present invention.

If no deviation is found that indicates a blade mass imbalance fault at 418, or in other configurations in which blade mass change is checked, if a monitored deviation or sudden change in acceleration, bending moments, and/or torque is found that indicates a blade mass change fault at 426, the atmospheric conditions indicated by the meteorological sensors are analyzed at 428 to determine whether icing is possible. If icing is possible, a blade mass change due to icing is signaled at 430. Some configurations signal a non-icing blade mass change at 432 if icing is determined not to be possible at 428, although blade mass change resulting from conditions other than icing is not indicated in every configuration of the present invention. A signal generated at 430 can be used in some configurations to automatically initiate correction action (such as activating deicers on a blade 108 determined to have icing or pitching rotor blades 108 at right angles to the wind to reduce stress). In some configurations, an icing-related blade mass change signal is indicated at a remote console to alert an operator that remedial action is warranted. In configurations in which blade mass change not due to icing is signaled, different correction action(s) may be warranted. Whether an how such corrective actions are performed is not considered to be an essential part of the present invention.

Signaling an icing-related blade mass anomaly when a blade mass anomaly is determined to exist and the monitored meteorological conditions are determined to be consistent with icing does not necessarily require that a binary signal indicating "icing" or "no icing" has to be provided. In some configurations, the signal that is provided may indicate an inferred probability of icing. In such cases, "signaling an icing-related blade mass anomaly when a blade mass anomaly is determined to exist" can mean signaling a low or zero probability of icing when the monitored meteorological conditions are determined not to be consistent with icing and a higher probability of icing when a blade mass anomaly is determined to exist and the monitored meteorological conditions are determined to be consistent with icing.

If no deviation indicative of blade mass change is found at 426 (or in configurations in which blade mass change is not checked and if no deviation indicative of blade mass imbalance is found at 416), steps 402, 404, 406, 408, and 410 can be repeated and the process represented by flow chart 400 continued.

Although many of the configurations described herein require a non-zero yaw error to utilize root bending moments to determine whether root bending moments are indicative of a blade mass anomaly, a non-zero yaw error is not a requirement in all configurations of the present invention. For example, if the yaw error is monitored or otherwise known, the computer, processor, and/or turbine controller 300 in some configurations can determine a gyroscopic load of rotor 106. Computer, processor, and/or turbine controller 300 can then provide an appropriate correction for and/or accommodate the determined gyroscopic load when determining whether to signal that a disturbance in a physical characteristic of wind turbine 100 is due to a blade mass anomaly.

In some configurations, blade mass anomalies can be detected by deliberately yawing nacelle 102. When nacelle 102 is yawed, gyroscopic loads so introduced will be constant unless a blade mass imbalance is present. Therefore, the presence of a variable gyroscopic load can be detected and used to signal a blade mass imbalance.

A blade mass anomaly may occur as a result of slowly forming ice that is very evenly distributed. In some cases, the resolution of the sensors may not be sufficient to detect such ice. However, if the resulting ice is shed unevenly, such as by suddenly shearing off one blade, there will be a sudden mass imbalance that can be detected.

Another physical parameter that can be used to detect blade mass anomalies is the angle of attack of rotor blades 108. When this angle of attack is outside of expected limits for a measured wind speed, reduced aerodynamic performance is likely caused by icing. Therefore, when pitch system 149 pitches rotor blades 108 outside of a predetermined nominal range for a wind speed measured by meteorological sensors 140, computer, processor, and/or turbine controller 300 in some configurations is programmed to signal a blade mass anomaly.

It will thus be appreciated that configurations of the present invention allow the detection and signaling of icing-related blade mass anomalies that can reduce the performance of wind turbine generators or cause potentially damaging system load conditions, allowing corrective actions to be taken if necessary.

While the invention has been described in terms of various specific embodiments, those skilled in the art will recognize that the invention can be practiced with modification within the spirit and scope of the claims.

What is claimed is:

1. A method for detecting ice on a wind turbine having a rotor and one or more rotor blades each having blade roots, said method comprising:
   monitoring meteorological conditions relating to icing conditions;
   monitoring one or more physical characteristics of the wind turbine in operation that vary in accordance with at least one of the mass of the one or more rotor blades or a mass imbalance between the rotor blades;
   using the one or more monitored physical characteristics to determine whether a blade mass anomaly exists;
   determining whether the monitored meteorological conditions are consistent with blade icing; and
   signaling an icing-related blade mass anomaly when a blade mass anomaly is determined to exist and the monitored meteorological conditions are determined to be consistent with icing.

2. A method in accordance with claim 1 wherein the rotor has a plurality of blades and the blade mass anomaly is a blade mass imbalance.

3. A method in accordance with claim 1 wherein the blade mass anomaly is a blade mass change.

4. A method in accordance with claim 1 further comprising monitoring yaw error, and wherein said signaling an icing related blade mass anomaly is further conditioned on the monitored yaw error being near zero.

5. A method in accordance with claim 4 further comprising monitoring yaw error, correcting the yaw error, repeating said monitoring of one or more physical characteristics of the wind turbine with the yaw error corrected, and said using the one or more monitored physical characteristics to determine whether a blade mass anomaly exists comprises using the physical characteristics monitored with the yaw error corrected.

6. A method in accordance with claim 1 further comprising monitoring yaw error, iterating said monitoring of the one or more physical characteristics of the wind turbine until the one or more physical characteristics are monitored with yaw error near zero, and said using the one or more monitored physical characteristics to determine whether a blade mass anomaly exists comprises using the physical characteristics monitored when the yaw error is near zero.

7. A method in accordance with claim 1 wherein the one or more physical characteristics of the wind turbine include rotor speed and acceleration.

8. A method in accordance with claim 1 wherein the one or more physical characteristics of the wind turbine include changes in bending moments.

9. A method in accordance with claim 1 wherein the one or more physical characteristics of the wind turbine include changes in at least one of mechanical torque or electrical torque.

10. A method in accordance with claim 1 wherein the one or more physical characteristics of the wind turbine include changes in rotor speed and acceleration.

11. A method in accordance with claim 1 wherein said monitoring one or more physical characteristics includes monitoring changes in pitch motor actuator response.

12. A method in accordance with claim 1 wherein said monitoring one or more physical characteristics includes monitoring acoustic properties of each blade.

13. A method in accordance with claim 1 wherein the blade mass anomaly is a blade mass change, and said monitoring one or more physical characteristics includes monitoring acoustic properties of a tower on which the wind turbine stands.

14. A method in accordance with claim 1 wherein the blade mass anomaly is a blade mass change, said monitoring one or more physical characteristics includes monitoring a system load of the wind turbine, and further wherein said using the one or more monitored physical characteristics to determine whether a blade mass anomaly exists comprises comparing the monitored system load to previously monitored system loads monitored under non-icing conditions with known wind conditions.

15. A method in accordance with claim 1 wherein the blade mass anomaly is a blade mass imbalance, said monitoring one or more physical characteristics includes monitoring oscillatory deviations of output power from the wind turbine.

16. A method in accordance with claim 1 further comprising signaling ice shedding when short-term transients are observed in the one or more monitored physical characteristics.

17. A method for detecting ice on a wind turbine having a rotor and one or more rotor blades each having blade roots, said method comprising:
monitoring meteorological conditions relating to icing conditions;
monitoring one or more physical characteristics of the wind turbine in operation, said physical characteristics including at least blade root bending moments, that vary in accordance with at least one of the mass of the one or more rotor blades or a mass imbalance between the rotor blades;
using the one or more monitored physical characteristics to determine whether a blade mass anomaly exists;
determining whether the monitored meteorological conditions are consistent with blade icing; and
signaling an icing-related blade mass anomaly when a blade mass anomaly is determined to exist and the monitored meteorological conditions are determined to be consistent with icing.

18. A method in accordance with claim 17 further comprising filtering wind shear signals from the monitored blade root bending moments to produce filtered blade root bending moments, and wherein said using the one or more monitored physical characteristics to determine whether a blade mass anomaly exists comprises using the filtered blade root bending moments.

19. A method in accordance with claim 17 wherein said monitoring one or more physical characteristics includes monitoring a signal from a strain sensing apparatus affixed or embedded in a rotor blades.

20. A method in accordance with claim 19 wherein the strain sensing apparatus is a strain gauge.

21. A method in accordance with claim 17 wherein said monitoring one or more physical characteristics includes monitoring deflections of a hub of the rotor at either a shaft or a shaft flange at or near connection of the shaft flange to the hub.

22. A method in accordance with claim 17 wherein said monitoring one or more physical characteristics includes monitoring strain in a hub of the rotor, a shaft, or a shaft flange at or near connection of the shaft flange to the hub.

23. A method in accordance with claim 17 wherein said monitoring one or more physical characteristics includes monitoring blade root bending moments utilizing optical fibers having Bragg gratings embedded in the one or more rotor blades.

24. A method in accordance with claim 17 wherein said monitoring one or more physical characteristics includes monitoring strain information obtained from instrumented T-bolts attaching a rotor blade to a hub of the rotor.

25. A method in accordance with claim 17 wherein said monitoring one or more physical characteristics includes monitoring deviations in a motion vector of a gear box of the wind turbine.

26. A method in accordance with claim 17 wherein said monitoring one or more physical characteristics includes monitoring bending moments at a plurality of locations in a span of the one or more rotor blades, and said using the one or more physical characteristics comprises using the monitored bending moments the plurality of locations to identify locations of possible icing.

27. A method in accordance with claim 17 wherein said monitoring one or more physical characteristics includes monitoring radial bending of a main shaft of the wind turbine.

28. A wind turbine comprising:
a rotor having one or more rotor blades;
one or more meteorological sensors configured to monitor meteorological conditions relating to icing;
one or more physical characteristic sensors configured to monitor one or more physical characteristics of the wind turbine in operation that vary in accordance with at least one of a mass of said one or more rotor blades or a mass imbalance between said rotor blades; and
a processor operably coupled to said one or more meteorological sensors and said one or more physical characteristic sensors, said processor configured to:
determine whether the monitored meteorological conditions are consistent with blade icing;
use the one or more monitored physical characteristics to determine whether a blade mass anomaly exists; and
generate a signal indicating an icing-related blade anomaly when the existence of a blade mass anomaly is determined and the monitored meteorological conditions are determined to be consistent with icing.

29. A wind turbine in accordance with claim 28 wherein said one or more physical characteristic sensors include at least one sensor configured to monitor blade azimuth position and at least one sensor configured to monitor rotor rotation speed.

30. A wind turbine in accordance with claim 28 wherein said computer is configured to monitor system loads of said wind turbine to previously monitored system loads monitored under non-icing conditions with known wind conditions.

31. A wind turbine in accordance with claim 28 wherein said one or more physical characteristic sensors comprise a plurality of sensors configured to monitor blade root bending located at different locations on spans of the rotor blades.

32. A wind turbine in accordance with claim 28 configured to identify locations of possible icing.

33. A wind turbine comprising:
a rotor having one or more rotor blades;
one or more meteorological sensors configured to monitor meteorological conditions relating to icing;
one or more physical characteristic sensors configured to monitor one or more physical characteristics of the wind turbine in operation that vary in accordance with at least one of a mass of said one or more rotor blades or a mass imbalance between said rotor blades, said physical characteristic sensors including at least one sensor that monitors blade root bending moments, and
a processor operably coupled to said one or more meteorological sensors and said one or more physical characteristic sensors, said processor configured to:
determine whether the monitored meteorological conditions are consistent with blade icing;
use the one or more monitored physical characteristics to determine whether a blade mass anomaly exists; and
generate a signal indicating an icing-related blade anomaly when the existence of a blade mass anomaly is determined and the monitored meteorological conditions are determined to be consistent with icing.

34. A wind turbine in accordance with claim 33 wherein said sensors configured to monitor blade root bending moments comprise strain measuring devices embedded in or affixed to said rotor blades.

35. A wind turbine in accordance with claim 33 wherein said strain measuring devices comprise strain gauges.

36. A wind turbine in accordance with claim 33 wherein said wind turbine further comprises a rotor hub, and said sensors configured to monitor blade root bending moments comprise one or more sensors configured to monitor deflections of said rotor hub.

37. A wind turbine in accordance with claim 33 wherein said wind turbine further comprises a main shaft, and wherein said sensors configured to monitor blade root bending moments comprise sensors configured to monitor a radial displacement of said shaft.

38. A wind turbine in accordance with claim 33 wherein said sensors configured to monitor blade root bending moments comprise optical fibers with Bragg gratings, and at least one said optical fiber is embedded in a blade root of each said rotor blade.

39. A wind turbine in accordance with claim 33 wherein said wind turbine further comprises a nacelle having a frame and said rotor further comprises a hub, and said sensors configured to monitor blade root bending moments comprise instrumenting T-bolts attaching said rotor blades to said hub.

40. A wind turbine in accordance with claim 33 wherein said wind turbine further comprises a gear box, and said sensors configured to monitor blade root bending moments comprise proximity probes configured to monitor gear box motion in a vertical plane and in a horizontal plane.

41. A wind turbine in accordance with claim 33 wherein said sensors configured to monitor blade bending moments comprise sensors configured to monitor deviations in a motion vector of a gear box of the wind turbine.

42. A wind turbine comprising a rotor having at least one blade, a nacelle, and a yaw control system, said wind turbine configured to yaw the nacelle and to signal a blade mass imbalance when a variable gyroscopic load is detected when the nacelle is yawed.

43. A method for detecting a blade mass imbalance comprising yawing a nacelle of a wind turbine and signaling a blade mass imbalance when a variable gyroscopic load is detected when the nacelle is yawed.

44. A wind turbine comprising a rotor having at least one blade, a pitch system, a turbine controller, and meteorological sensors configured to measure meteorological conditions including wind speed and precipitation type, said controller configured to signal a blade mass anomaly when said blades are pitched outside of a predetermined nominal range for a measured wind speed and measured conditions exist that are conducive to icing.

45. A method for detecting a blade mass anomaly on a wind turbine having at least one blade, a pitch system, and meteorological sensors configured to measure meteorological conditions including, wind speed and precipitation type, said method comprising measuring a wind speed using the meteorological sensors, comparing a pitch of the blades to a predetermined nominal range for the measured wind speed, and signaling a blade mass anomaly when the blades are pitched outside of the predetermined nominal range for the measured wind speed and measured conditions exist that are conducive to icing.

* * * * *